US010899402B2

(12) United States Patent
Sun

(10) Patent No.: US 10,899,402 B2
(45) Date of Patent: Jan. 26, 2021

(54) GENERAL-PURPOSE SIX-LEGGED WALKING ROBOT, AND MAIN STRUCTURE THEREOF

(71) Applicant: Tianqi Sun, Beijing (CN)

(72) Inventor: Tianqi Sun, Beijing (CN)

(*) Notice: Subject to any disclaimer, the term of this patent is extended or adjusted under 35 U.S.C. 154(b) by 85 days.

(21) Appl. No.: 16/095,363

(22) PCT Filed: Apr. 20, 2017

(86) PCT No.: PCT/CN2017/081300
§ 371 (c)(1),
(2) Date: Jun. 21, 2019

(87) PCT Pub. No.: WO2017/181975
PCT Pub. Date: Oct. 26, 2017

(65) Prior Publication Data
US 2019/0315419 A1   Oct. 17, 2019

(30) Foreign Application Priority Data

Apr. 21, 2016  (CN) .............................. 2016 1 051449
Apr. 21, 2016  (CN) .......................... 2016 1 0251448
(Continued)

(51) Int. Cl.
*B62D 57/032*   (2006.01)
*G05D 1/02*   (2020.01)

(52) U.S. Cl.
CPC ......... *B62D 57/032* (2013.01); *G05D 1/0246* (2013.01); *G05D 2201/02* (2013.01)

(58) Field of Classification Search
CPC . B62D 57/032; G05D 1/0246; G05D 2201/02
See application file for complete search history.

(56) References Cited

U.S. PATENT DOCUMENTS 4,527,650 A * 7/1985 Bartholet ............. B62D 57/032
                                                   180/8.6
5,005,658 A * 4/1991 Bares .................... B62D 57/02
                                                   180/8.1
(Continued)

FOREIGN PATENT DOCUMENTS

CN         105172933      * 12/2015

*Primary Examiner* — Jacob D Knutson
*Assistant Examiner* — Michael R Stabley
(74) *Attorney, Agent, or Firm* — Houtteman Law LLC

(57) ABSTRACT

A six-legged universal walking robot and main structure thereof. The main structure comprises a head portion and a machine body. A distance measuring camera device is provided within the head portion, and comprises a rotating head and a frontal face distance measuring assembly. The machine body is provided with a turntable, and the rotating head is fixed to the turntable. A driving mechanism and a main control circuit board are mounted within an internal cavity of the machine body, the driving mechanism has a rotating shaft provided with multiple slip rings on an outer peripheral surface thereof. When the robot needs to observe the surrounding environment, the driving mechanism can drive the turntable to rotate in a range of 360 degrees, a rotation range of 360 degrees can also be achieved for the distance measuring camera module without moving the body.

16 Claims, 13 Drawing Sheets

(30) Foreign Application Priority Data

Apr. 21, 2016 (CN) .................... 2016 2 0339950 U
Apr. 21, 2016 (CN) .................... 2016 2 0340502 U

(56) References Cited

U.S. PATENT DOCUMENTS

| | | | | |
|---|---|---|---|---|
| 5,127,484 | A * | 7/1992 | Bares | B62D 57/02 |
| | | | | 180/8.1 |
| 5,219,410 | A * | 6/1993 | Garrec | B62D 57/02 |
| | | | | 180/8.1 |
| 5,346,400 | A * | 9/1994 | Shin | G08B 13/00 |
| | | | | 439/17 |
| 5,351,773 | A * | 10/1994 | Yanagisawa | B62D 57/032 |
| | | | | 180/8.3 |
| 5,423,708 | A * | 6/1995 | Allen | A63H 11/205 |
| | | | | 180/8.6 |
| 5,685,383 | A * | 11/1997 | Ferrante | B62D 57/032 |
| | | | | 180/8.6 |
| 6,588,701 | B2 * | 7/2003 | Yavnai | G05D 1/0038 |
| | | | | 244/12.1 |
| 6,681,150 | B1 * | 1/2004 | Haga | A63H 3/006 |
| | | | | 180/8.6 |
| 7,040,248 | B1 * | 5/2006 | Whitfield | B63B 29/04 |
| | | | | 104/45 |
| 8,657,042 | B2 * | 2/2014 | Mantzel | A63H 11/20 |
| | | | | 180/7.1 |
| 2002/0060267 | A1 * | 5/2002 | Yavnai | B64C 39/024 |
| | | | | 244/23 A |

* cited by examiner

GENERAL-PURPOSE SIX-LEGGED WALKING ROBOT, AND MAIN STRUCTURE THEREOF

TECHNICAL FIELD

The present application relates to a robot, and more particularly relates to a six-legged universal walking robot and a machine body structure thereof.

BACKGROUND ART

With the development of technology, many repeated activities or activities with potential safety hazards of human are replaced by robots, among which multi-legged robots have advantages in specific applications thanks to its adaption to various complex terrains. However, due to the feature of multi-legged gait, the multi-legged robot turns around by marking time, which would consume relatively long time and cause low efficiency, and is obviously not as good as a wheeled robot (which may turn around directly). Furthermore, it is very hard for the machine body to keep steady, which causes a great difficulty in use in photographing and surveying and mapping. In addition, as legs may not automatically detect whether feet touch the ground or not in walking, the working state may be affected and the service life may be influenced if the feet failing in touch with the ground do not be founded and repaired in time.

Therefore, the existing multi-legged robot has problems of high cost, low efficiency, high time consumption and high difficulty in keeping steady.

SUMMARY OF THE INVENTION

The present application aims to solve the technical problem that an existing multi-legged robot has problems of low efficiency, high time consumption, short service life and high difficulty in keeping steady.

To solve the technical problem, the technical solution adopted by the present application is to provide a machine body structure of a six-legged universal walking robot. The machine body structure includes a head portion and a machine body. A distance measurement camera device is arranged on the inner side of the head portion, and includes a rotating head and a frontal face distance measurement assembly mounted on the rotating head. The frontal face distance measurement assembly includes a frontal face and an inner liner panel arranged on the inner side of the frontal face. A distance measurement camera module is mounted on the frontal face inner liner panel.

A turntable is arranged on the upper surface of the machine body. The rotating head is fastened and fixed on the turntable on which a first circuit board is arranged. The distance measurement camera module is connected with the first circuit board. A driving mechanism and a main control circuit board are mounted in an inner cavity of the machine body. The driving mechanism is provided with a rotating shaft. Multiple conductive sliding rings for data communication with the main control circuit board are arranged on the peripheral surface of the rotating shaft. The driving mechanism may drive the turntable to rotate 360°.

In the above-mentioned solution, the driving mechanism is a gear driving mechanism, and includes a driving wheel and a driven wheel which mesh with each other for transmission. The driving wheel is connected with a drive motor. The rotating shaft is arranged on the driven wheel in a penetrating manner and rotates along with the driven wheel. The turntable is fixed with the driven wheel.

In the above-mentioned solution, the lower end of the rotating shaft is inserted into a shaft sleeve in which an electric brush matched and electrically connected with the conductive sliding rings is arranged. The electric brush is electrically connected with the main control circuit board. A lead wire electrically connected with the first circuit board is arranged in the rotating shaft. The lower end of the lead wire is connected with the conductive sliding rings, and the upper end of the lead wire penetrates through the rotating shaft and is connected with the first circuit board.

In the above-mentioned solution, the machine body includes an upper cover and a lower cover which are fastened with each other. The inner cavity is formed between the upper cover and the lower cover. An annular plate is arranged at the middle part of the inner cavity to divide the inner cavity into an upper cavity and a lower cavity. A first mounting seat and a second mounting seat which are respectively used for mounting the driving wheel and the driven wheel are arranged on the upper surface of the annular plate. The drive motor is mounted in the lower cavity and is coaxial with the driving wheel.

In the above-mentioned solution, the main control circuit board is mounted on the annular plate. Multiple first servo motors for driving legs of the robot to rotate 180° are spaced at intervals in the inner cavity along a circumference, and are electrically connected with the main control circuit board.

In the above-mentioned solution, each of the upper cover and the lower cover includes a chassis and a plurality of first convex covers arranged around the chassis along a circumference. Connected second convex covers are arranged between any two adjacent first convex covers. A mounting position for accommodating each first servo motor is formed between two second convex covers at corresponding positions on the upper cover and the lower cover.

In the above-mentioned solution, an infrared lamp module is further arranged on the inner liner panel, and is connected with the first circuit board.

In the above-mentioned solution, an infrared sensor and a video processing module wirelessly connected with the infrared sensor are further arranged on the inner liner panel. The video processing module is connected to the first circuit board.

In the above-mentioned solution, the front end of the rotating head upwards protrudes and is provided with a frontal face mounting seat matched with the frontal face, and the frontal face is embedded into the frontal face mounting seat.

The present application further discloses a six-legged universal walking robot, including the above-mentioned machine body structure and further including multiple leg structures which are radially symmetrically distributed around the machine body structure.

Each leg structure includes a thigh, a shank and a foot which are connected in sequence. The thigh is connected with the machine body through a hip joint and is connected with the shank through a knee joint. The shank is connected with the foot through an ankle joint. A second servo motor and a third servo motor are arranged in the shank at intervals. The second servo motor and the third servo motor are electrically connected with the main control circuit board respectively and are connected with the knee joint and the ankle joint respectively to drive the shank and the foot to rotate 180° respectively around the knee joint and the ankle joint.

In the above-mentioned solution, the ground touch end of the foot is provided with a rubber contact having an outer curved shape. The inner side of the rubber contact is provided with a connecting column. A limit switch is arranged inside the foot and is connected to the main control circuit board. When the foot touches the ground, the rubber contact is pressed, and the connecting column is pushed to be in contact with the limit switch to actuate the limit switch to be turned on.

In the above-mentioned solution, a static contact block and a movable contact block are arranged on the bottom surface of the limit switch at intervals, and a columnar connecting contact is arranged on the bottom surface of the movable contact block.

In the above-mentioned solution, the connecting column includes a column head fitted to the inner surface of the rubber contact and an outwards extending column rod. When the connecting column moves under the pushing of the rubber contact, the column rod touches the connecting contact to actuate the limit switch to be turned on.

In the above-mentioned solution, the hip joint, the thigh and the knee joint are integrated, and the thigh is shorter than the hip joint and the knee joint in a horizontal direction.

In the above-mentioned solution, the ankle joint and the foot are integrated, and the foot is inclined at an inclination angle of 45° towards one side of the ground along a horizontal plane where the ankle joint is placed.

In the above-mentioned solution, a first U-shaped groove for holding the machine body is formed in the hip joint. A second U-shaped groove for holding one end of the shank is formed in the knee joint. A first through hole penetrating through the shank is formed in the inner surface of the knee joint. A first revolving shaft passes through the first through hole to hinge the knee joint to the shank.

In the above-mentioned solution, a third U-shaped groove for holding the other end of the shank is formed in the ankle joint. A second through hole penetrating through the shank is formed in the inner surface of the ankle joint. A second revolving shaft passes through the second through hole to hinge the ankle joint to the foot.

According to the six-legged universal walking robot and the machine body structure thereof of the present application, when a surrounding environment is required to be observed, the main control circuit board controls the driving mechanism to drive the turntable to rotate 360°. As the distance measurement camera device is fixed on the turntable, the distance measurement camera module and the indicating lamp module may rotate 360° at the same time without the movement of the machine body. The six-legged universal walking robot and the machine body structure thereof are simple in structure and flexible and convenient to use.

DETAILED DESCRIPTION OF THE INVENTION

The present application is described below in detail in combination with the accompanying drawings of the description.

Figure 1:
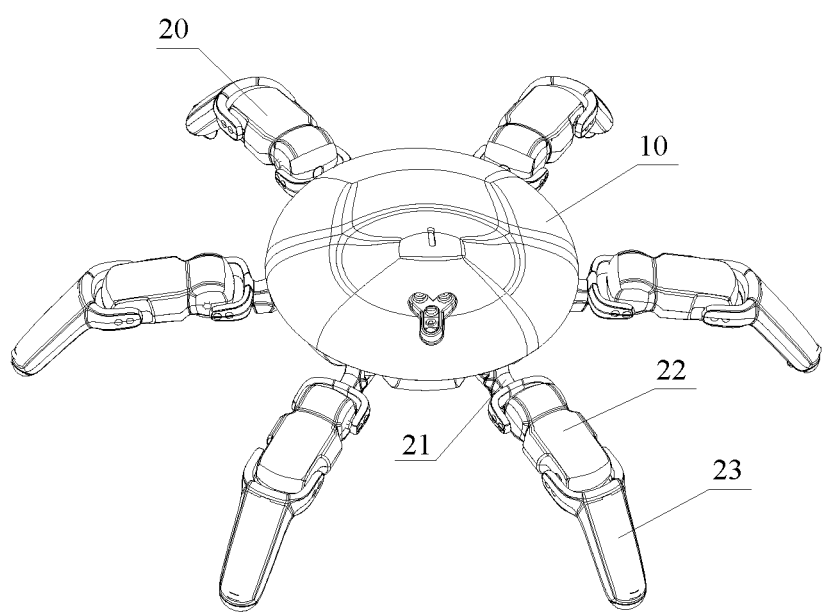
FIG. 1 is a structure schematic diagram of the present application.
Figure 2:
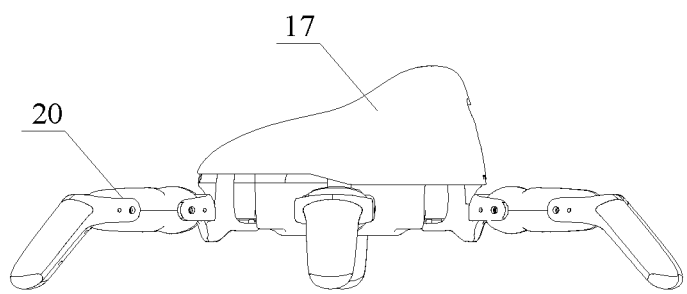
FIG. 2 is a side view of the present application.
Figure 7:
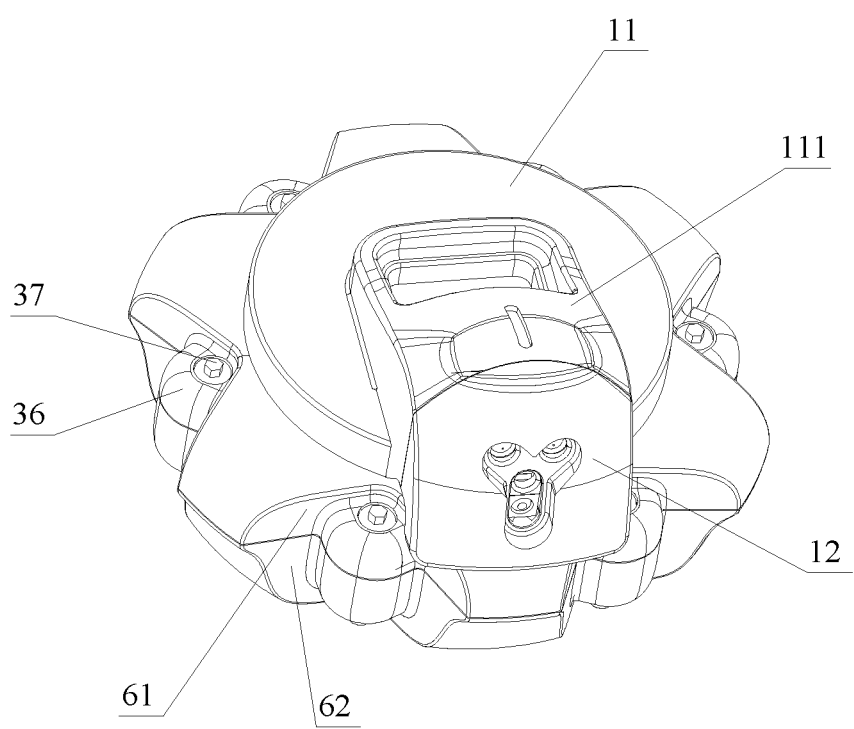
FIG. 7 is a structure schematic diagram of a cap-removed machine body structure in the present application.

As shown in FIGS. 1, 2 and 7, the present application provides a machine body structure of a six-legged universal walking robot. The machine body structure includes a head portion and a machine body 10. The head portion includes a cap 17 and a distance measurement camera device mounted inside the cap 17. The cap 17 effectively protects the distance measurement camera device and internal components thereof from dust entry and prolong the service life. A first circuit board 14 and a main control circuit board 40 are respectively mounted in the machine body 10 and are used as control systems for controlling operations of the machine body structure and leg structures of the six-legged universal walking robot. The first circuit board 14 would transmit received information to the main control circuit board 40, and the main control circuit board 40 sends an instruction uniformly for control processing.

Figure 3:
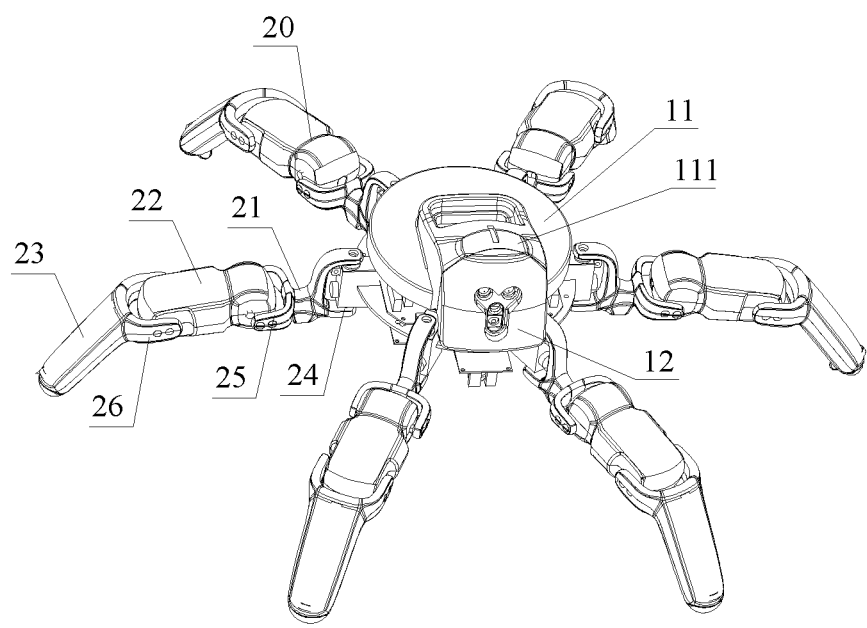
FIG. 3 is a structure schematic diagram of the present application without a cap.
Figure 4:
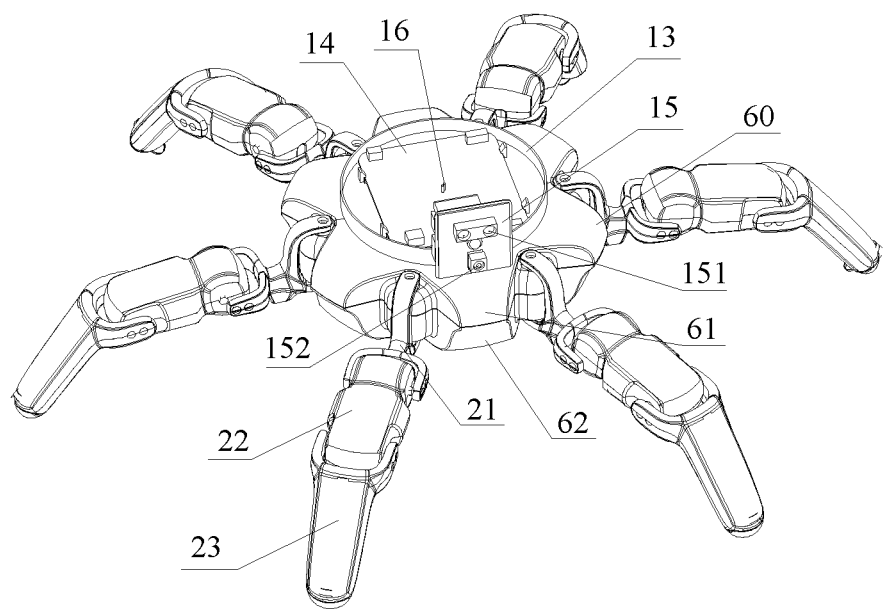
FIG. 4 is a structure schematic diagram of the product in FIG. 3 without a frontal face.
Figure 8:
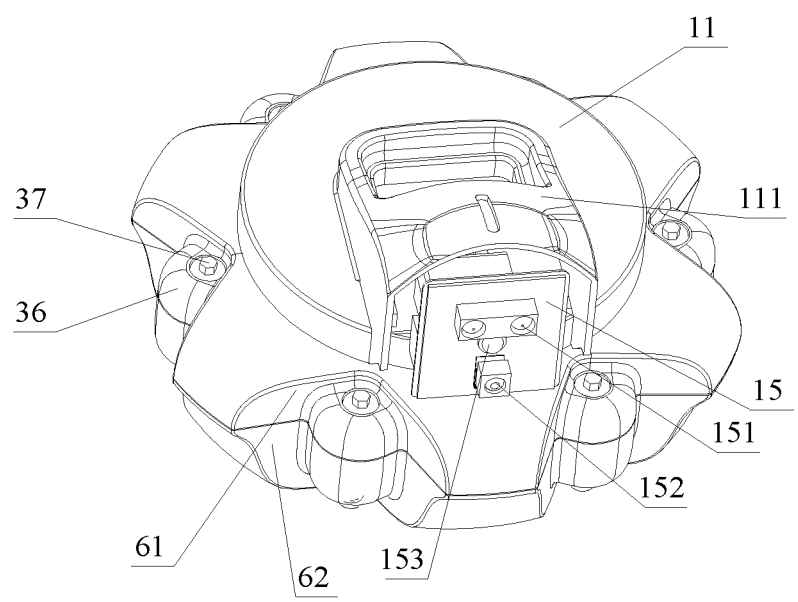
FIG. 8 is a structure schematic diagram of the product in FIG. 7 without a frontal face.

As shown in FIGS. 3 and 8, the distance measurement camera device includes a rotating head 11 and a frontal face distance measurement assembly mounted on the rotating head 11. The frontal face distance measurement assembly includes a frontal face 12 and an inner liner panel 15 arranged on the inner side of the frontal face 12. The front end of the rotating head 11 upwards protrudes and is provided with a frontal face mounting seat 111 matched with the frontal face 12, and the frontal face 12 is embedded into the frontal face mounting seat 111 so as to ensure that the frontal face 12 may synchronously move along with the movement of the rotating head 11. A distance measurement camera module 151 connected with the first circuit board 14 is mounted on the inner liner panel 15. The distance measurement camera module 151 may be a camera and may effectively detect position information and distance information in front of the frontal face 12 and send the information to the first circuit board 14.

An infrared lamp module 152 is further arranged on the inner liner panel 15 and is connected with the first circuit board 14. It may be used as an infrared light source in a dark place to enable a camera to shoot night vision images and also may emit a modulation infrared signal to remotely control various household appliances and the like.

An infrared sensor 153 and a video processing module wirelessly connected with the infrared sensor 153 are further arranged on the inner liner panel 15. The video processing module is connected to the first circuit board 14. The video processing module which may systematically process a video scene shot by the camera and the infrared sensor 153 which may effectively detect an obstacle are combined to analyze an observed target so as to determine whether the robot arrives at a target region or not.

The head portion is further provided with an indicating lamp module connected with the first circuit board 14 and being capable of sending an indicating lamp signal, so that it is convenient for people to find the position of the robot and control the robot. In addition, the indicating lamp module also may emit light in different colors and brightness to indicate different states of the robot, such as a network connection condition, a low electric quantity or a charging state. Various twinkling and breathing effects may be made, so that it is convenient for an operator to master the working condition. The indicating lamp module is visual and convenient.

Referring to FIGS. 4, 5, 6 and 10, a turntable 13 is arranged on the upper surface of the machine body 10. The rotating head 11 is fastened and fixed on the turntable 13 on which the first circuit board 14 is arranged. The machine body 10 includes an upper cover 61 and a lower cover 62 which are fastened with each other. A position between the upper cover 61 and the lower cover 62 is hollowed to form an inner cavity in which a driving mechanism and the main control circuit board 40 are mounted. The driving mechanism is provided with a rotating shaft 16. Multiple conductive sliding rings for data communication with the main control circuit board 40 are arranged on the peripheral surface of the rotating shaft 16. The driving mechanism may drive the turntable 13 to rotate 360°.

Specifically, the driving mechanism is a gear driving mechanism which may drive the turntable 13 and the rotating head 11 to rotate 360°. Under the condition that the leg structures of the robot are fixed, the rotating head 11 may directly rotate towards two directions infinitely, with high flexibility. The gear driving mechanism includes a driving wheel 30 and a driven wheel 31 which mesh with each other for transmission. The driving wheel 30 is connected with a drive motor which is connected with the main control circuit board 40 and is controlled by the main control circuit board 40 to be switched on or switched off. The rotating shaft 16 is arranged at the middle part of the driven wheel 31 in a penetrating manner, rotates along with the driven wheel 31, and passes through the turntable 13 and the first circuit board 14. The upper end of the driven wheel 31 is provided with a connecting disk 164 which is connected with the rotating shaft 16. An interpenetrating threaded hole is formed in the connecting disk 164, and the connecting disk 164 is fixedly connected with the turntable 13 through a screw. When the driven wheel 31 rotates, the connecting disk 164 rotates along with it and drives the turntable 13 to rotate.

The lower end of the rotating shaft 16 is inserted into a shaft sleeve 162 in which an electric brush matched and electrically connected with the conductive sliding rings is arranged. The electric brush is electrically connected with the main control circuit board 40. A lead wire 161 electrically connected with the first circuit board 14 is arranged in the rotating shaft 16. The lower end of the lead wire 161 is connected with the conductive sliding rings, and the upper end of the lead wire 161 penetrates through the rotating shaft 16 and is connected with the first circuit board 14. When the driven wheel 31 rotates, the rotating shaft 16 rotates synchronously. Due to the arrangement of the conductive sliding rings, the lead wire 161 would not be twisted or knotted, so that the turntable 13 may be driven to rotate 360°.

Figure 5:
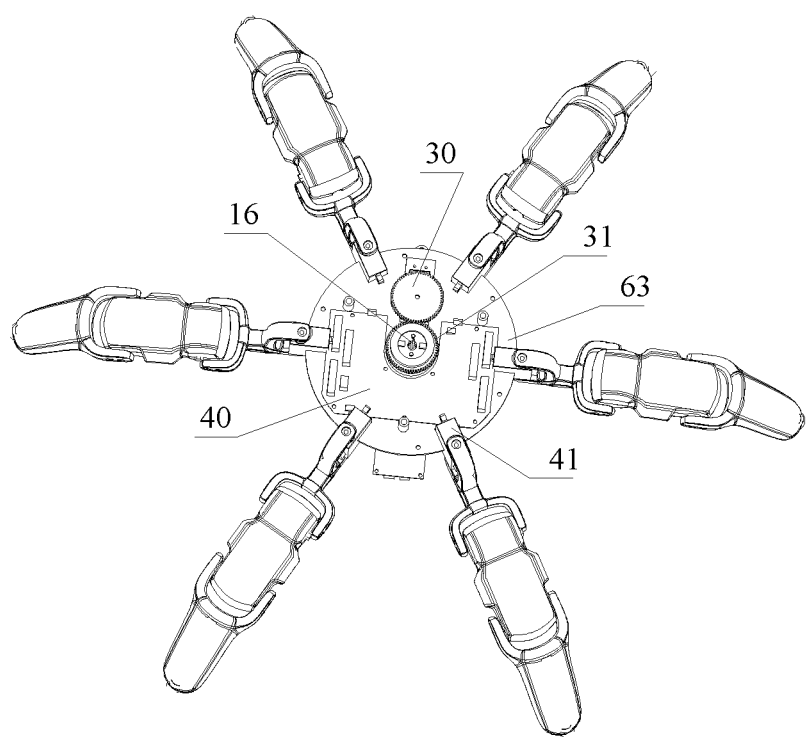
FIG. 5 is a structure view of the product in FIG. 4 without a rotating head.
Figure 6:
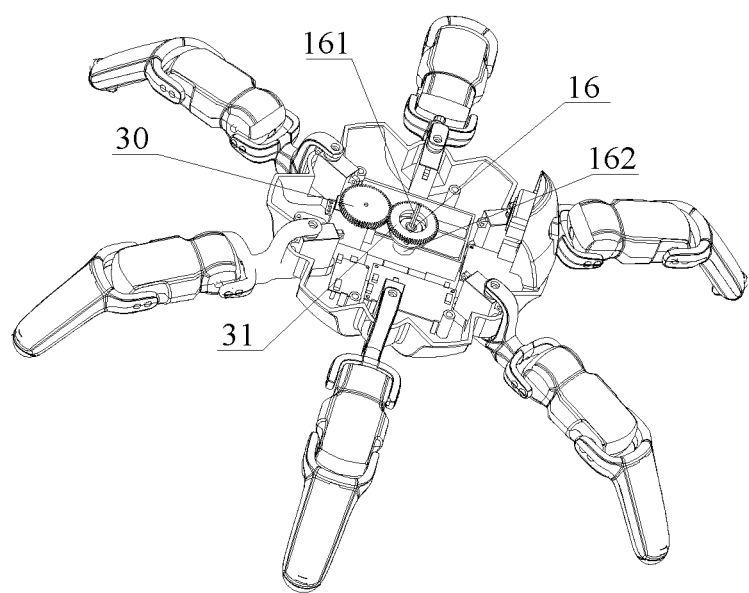
FIG. 6 is a structure schematic diagram of a machine body structure in the present application.
Figure 10:
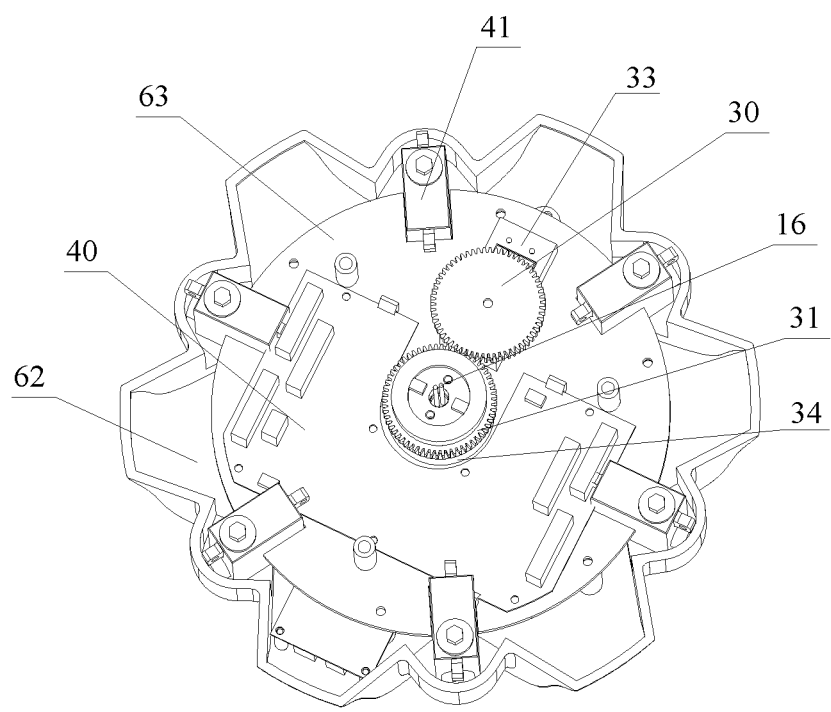
FIG. 10 is a structure diagram of the product in FIG. 9 without a turntable and a first circuit board.

Referring to FIGS. 5 and 10, an annular plate 63 is arranged at the middle part of the inner cavity of the machine body 10 to divide the inner cavity into an upper cavity and a lower cavity. A first mounting seat 33 and a second mounting seat 34 which are respectively used for mounting the driving wheel 30 and the driven wheel 31 are arranged on the upper surface of the annular plate 63. The driving wheel 30 and the driven wheel 31 are respectively located on the first mounting seat 33 and the second mounting seat 34. The drive motor is mounted in the lower cavity and is coaxial with the driving wheel 30 to provide power for the motion of the driving shaft 30.

A circular hole is formed in the middle part of the annular plate 63. The rotating shaft 16 passes through the circular hole from the lower cavity to the upper cavity and passes through the center of the driven wheel 31 in sequence in the upper cavity. When the drive motor is switched on to drive the driving wheel 30 to rotate, the driving wheel 30 drives the driven wheel 31 to rotate synchronously, and at the same time, the driven wheel 31 drives the rotating head 11 to rotate synchronously at a rotating angle from 0 to 360°.

The main control circuit board 40 is mounted on the annular plate 63. Multiple first servo motors 41 are spaced at intervals in the inner cavity along a circumference, and are connected with the main control circuit board 40. The first servo motors 41 are used for driving the leg structures of the robot to rotate 180°.

Figure 9:
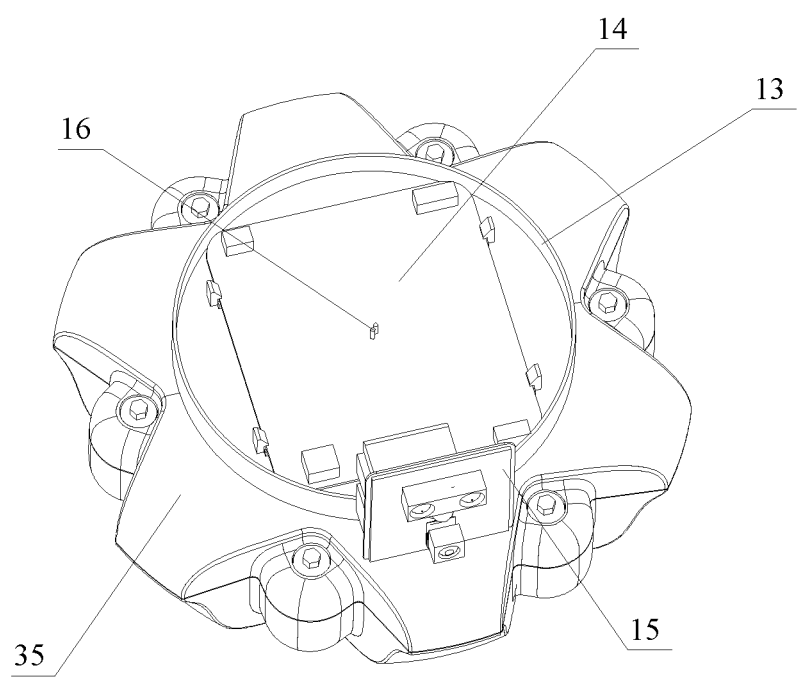
FIG. 9 is a structure diagram of the product in FIG. 8 without a rotating head.

Referring to FIGS. 7, 8 and 9, each of the upper cover 61 and the lower cover 62 respectively includes a chassis and a plurality of first convex covers 35 arranged around the chassis along a circumference. The chassis is used for mounting the turntable 50 or touching the ground. Connected second convex covers 36 are arranged between any two adjacent first convex covers 35. A mounting position for accommodating each first servo motor 41 is formed between two second convex covers 36 at corresponding positions on the upper cover 61 and the lower cover 62. The first servo motors 41 are arranged in the mounting positions and clamp the annular plate 70 from the middle part, so that the structure is stable and reliable. Mounting shafts 37 are inserted into the middle parts of the upper ends of the second convex covers 36 to mount the leg structures of the robot.

When a surrounding environment is required to be observed, the main control circuit board controls the gear driving mechanism to drive the turntable to rotate 360°. As the distance measurement camera device is fixed on the turntable, the distance measurement camera module and the indicating lamp module may rotate 360° at the same time without the movement of the machine body. The six-legged universal walking robot and the machine body structure thereof are simple in structure and flexible and convenient to use.

The present application further provides a six-legged universal walking robot, including the above-mentioned machine body structure and further including multiple leg structures which are radially symmetrically distributed around the machine body structure. In the present invention, preferably, there are six leg structures symmetrically and uniformly distributed around the machine body structure.

Figure 11:
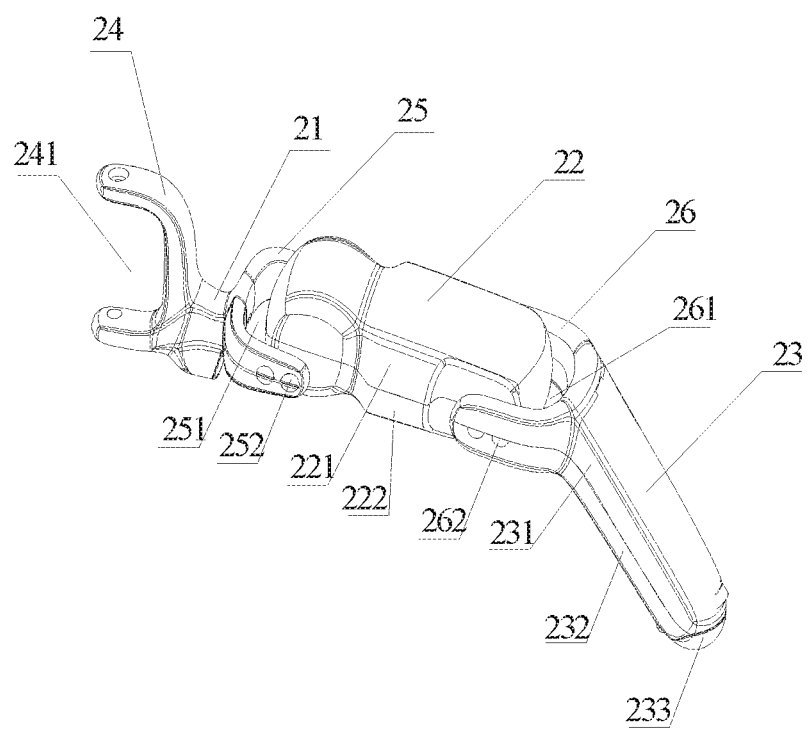
FIG. 11 is a structure schematic diagram of a leg structure in the present application.
Figure 12:
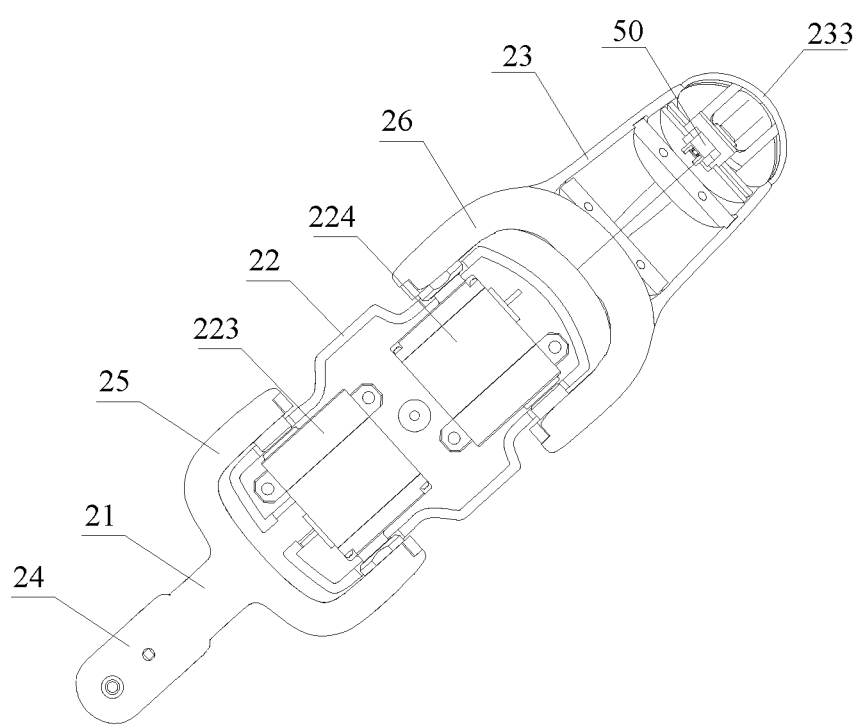
FIG. 12 is a structure schematic diagram of the inside of the leg structure in the present application.
Figure 13:
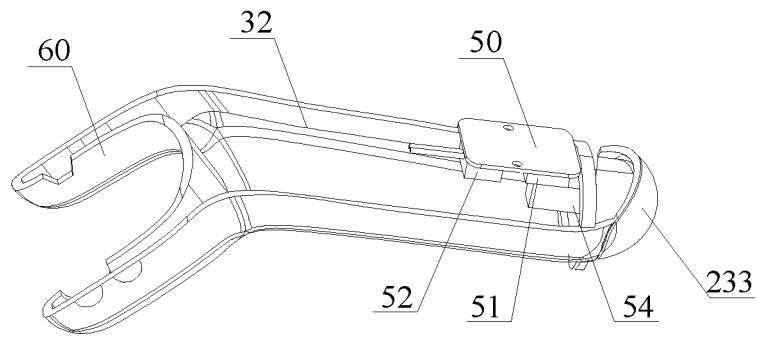
FIG. 13 is a structure schematic diagram of a limit switch and a rubber contact of the leg structure in the present application.
Figure 14:
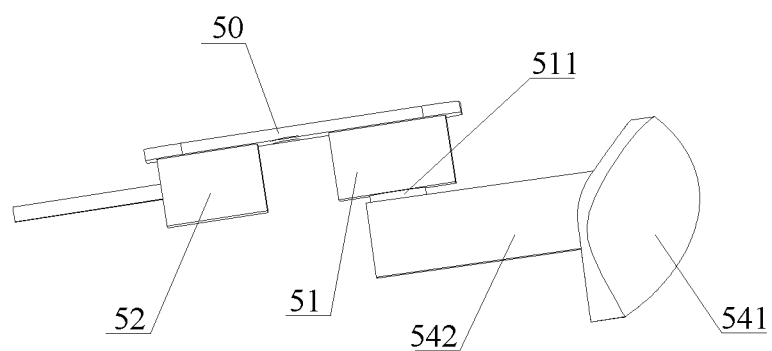
FIG. 14 is a diagram of a state showing that the limit switch of the leg structure in the present application is in contact with a connecting column.

Referring to FIGS. 3, 11 and 12, each leg structure includes a thigh 21, a shank 22 and a foot 23 which are connected in sequence. The thigh 21 is connected with a machine body through a hip joint 24 and is connected with the shank 22 through a knee joint 25. The shank 22 is connected with the foot 23 through an ankle joint 26.

The hip joint 24, the thigh 21 and the knee joint 25 are integrated, so that the structure is compact, and machining and installation are facilitated. The thigh 21 is shorter than the hip joint 24 and shorter than the knee joint 25 in a horizontal direction, thereby greatly simplifying the structure of the thigh, reducing the overall weight of the leg structure, reducing the energy consumption and making walking lightsome and convenient. In the present application, as the leg structure is radially symmetric, it is defined that a frontal face 12 faces to the front in a moving process. Therefore, the robot, with one front foot or two front feet randomly rotating towards a certain angle, may directly move forwards.

Referring to FIG. 11, a first U-shaped groove 241 for holding the machine body is formed in the hip joint 24. A second U-shaped groove 251 for holding one end of the shank 22 is formed in the knee joint 25. A first through hole 252 penetrating through the shank 22 is formed in a position, close to the outer end of the second U-shaped groove 251, on the inner surface of the knee joint 25. A first revolving shaft passes through the first through hole 252 to hinge the knee joint 25 to the shank 21. The hip joint 24 may drive the shank 22 to rotate up and down around the first revolving shaft to implement relative rotation between the shank 22 and the thigh 21.

A third U-shaped groove 261 for holding the other end of the shank 22 is formed in the ankle joint 26. A second through hole 262 penetrating through the shank 22 is formed in a position, close to the outer end of the third U-shaped groove 261, on the inner surface of the ankle joint 26. A second revolving shaft passes through the second through hole 262 to hinge the ankle joint 26 to the foot 23. The ankle joint 26 may drive the foot to rotate up and down around the second revolving shaft to implement relative rotation between the foot 23 and the shank 22.

Preferably, the ankle joint 26 and the foot 23 are integrated, so that the structure is simplified and the weight is reduced. The foot 23 is inclined at an inclination angle of 45° towards the ground along a horizontal plane of the ankle joint 26. The foot 23 of this structure has an extremely good support force so as to prevent the thigh 21 and the shank 22 from touching the bottom surface and also facilitate its walking on the ground.

Referring to FIGS. 11 and 12, the shank 22 is formed by fastening a shank upper cover 221 and a shank lower cover 222, with an accommodating cavity formed inside. A second servo motor 223 and a third servo motor 224 are arranged in the accommodating cavity at intervals. The second servo motor 223 and the third servo motor 224 are electrically connected with the main control circuit board 40 respectively, receive the control signal of the main control circuit board 40 to operate and are connected with the knee joint 25 and the ankle joint 26 respectively. The second servo motor 223 drives the shank 22 to rotate 180° around the knee joint 25, namely to rotate upwards 90° and downwards 90°. The third servo motor 224 drives the foot 23 to rotate 180° around the ankle joint 26, namely to rotate upwards 90° and downwards 90°. Each first servo motor 41 is connected with the hip joint 24 and drives the thigh 21 to rotate 180° around the hip joint 24, namely to rotate leftwards 90° and rightwards 90°.

Referring to FIGS. 11, 12, 13 and 14, the foot 23 is formed by fastening a foot upper cover 231 and a foot lower cover 232, with an accommodating cavity formed inside. The ground touch end of the foot 23 is provided with a rubber contact 233 having an outer curved shape. The rubber contact 233 which is made of rubber may contract and deform under pressure. The inner side of the rubber contact 233 is provided with a connecting column 54 which includes a column head 541 fitted to the inner surface of the rubber contact 233 and an outwards extending column rod 542.

A limit switch 50 is arranged inside the accommodating cavity of the foot 23 and is connected to the main control circuit board 40. When the foot 23 touches the ground, the rubber contact 233 is pressed, and the connecting column 54 is pushed to be in contact with the limit switch 50 to actuate the limit switch 50 to be turned on and transmit a signal to the main control circuit board 40.

Specifically, a static contact block 52 and a movable contact block 51 are arranged on the bottom surface of the limit switch 50 at intervals. A columnar connecting contact 511 is arranged on the bottom surface of the movable contact block 51. When the connecting column 54 moves under the pushing of the rubber contact 233, the column rod 542 touches the connecting contact 511 to actuate the limit switch 50 to be turned on, and the limit switch 50 transmits relevant signals to the main control circuit board 40. The limit switch 50 is simple in structure, may accurately detect whether the foot 23 touches the ground or not and has a high practical value.

According to the present application, only when the feet touch the ground, the rubber contacts may be pressed by the ground to push the connecting columns to be in contact with the limit switches to actuate the limit switches to be turned on, and then the limit switches transmit the signals to the main control circuit board, thereby judging that the feet may walk normally. Or, if the feet are damaged and may not walk normally, the limit switches may not be actuated to be turned on. People can find out a problem in time according to the signals transmitted by the main control circuit board so as to improve the working quality of a multi-legged robot and repair the damaged feet in time.

The radially symmetrically distributed robot legs may keep the multi-legged robot in balance, so that the robot is safe and reliable. When the multi-legged robot needs to turn around during walking, it only needs to drive the rotating head to rotate 360° through the gear driving mechanism, and the machine body does not need to rotate, so that the rotation is flexible and fast, and the time is saved. The robot has a low requirement for the environment and is low in cost and extremely high in practical value.

The present application is not limited to the above-mentioned optimal implementation mode. Any one should know that any structural changes that are made under the inspiration of the present application and have the same or similar technical solutions as the present application shall all fall within the protection scope of the present application.

What is claimed is:

1. A machine body structure of a six-legged universal walking robot, comprising a head portion and a machine body, wherein
   a distance measurement camera device is provided within the head portion, and comprises a rotating head and a frontal face distance measurement assembly mounted on the rotating head; the frontal face distance measurement assembly comprises a frontal face and an inner liner panel arranged on the inner side of the frontal face; a distance measurement camera module is mounted on the inner liner panel;
   a turntable is arranged on the upper surface of the machine body; the rotating head is fastened and fixed on the turntable on which a first circuit board is arranged; the distance measurement camera module is connected with the first circuit board; the machine body has an inner cavity and a driving mechanism and a main control circuit board are mounted within the inner cavity; the driving mechanism is provided with a rotating shaft; multiple conductive sliding rings for data communication with the main control circuit board are arranged on the peripheral surface of the rotating shaft; and the driving mechanism may drive the turntable to rotate 360°;

wherein the driving mechanism is a gear driving mechanism, and comprises a driving wheel and a driven wheel which mesh with each other for transmission; the rotating shaft penetrates through the driven wheel and rotates along with the driven wheel, and the turntable is fixed with the driven wheel.

2. The machine body structure of the six-legged universal walking robot according to claim 1, wherein the lower end of the rotating shaft is inserted into a shaft sleeve in which an electric brush matched and electrically connected with the conductive sliding rings is arranged; the electric brush is electrically connected with the main control circuit board; a lead wire electrically connected with the first circuit board is arranged in the rotating shaft; and the lower end of the lead wire is connected with the conductive sliding rings, and the upper end of the lead wire penetrates through the rotating shaft and is connected with the first circuit board.

3. The machine body structure of the six-legged universal walking robot according to claim 1, wherein the machine body comprises a upper cover and a lower cover which are buckled with each other; the inner cavity is formed between the upper cover and the lower cover; an annular plate is arranged in the middle of the inner cavity to divide the inner cavity into an upper cavity and a lower cavity; a first mounting seat and a second mounting seat which are respectively used for mounting the driving wheel and the driven wheel are arranged on the upper surface of the annular plate; and the drive motor is mounted in the lower cavity and is coaxial with the driving wheel.

4. The machine body structure of the six-legged universal walking robot according to claim 3, wherein the main control circuit board is mounted on the annular plate; multiple first servo motors for driving legs of the robot to rotate 180° are spaced at intervals in the inner cavity along a circumference, and are electrically connected with the main control circuit board.

5. The machine body structure of the six-legged universal walking robot according to claim 3, wherein the upper cover and the lower cover respectively comprises a chassis and a plurality of first convex covers arranged on the periphery of the chassis along a circumference; and a plurality of second convex covers which are connected with any of the two adjacent first convex covers is arranged between every the two adjacent first convex covers; and a mounting position for accommodating the first servo motor is formed between the two second convex covers at corresponding positions on the upper cover and the lower cover.

6. The machine body structure of the six-legged universal walking robot according to claim 1, wherein an infrared lamp module is further arranged on the inner liner panel, and is connected with the first circuit board.

7. The machine body structure of the six-legged universal walking robot according to claim 1, wherein an infrared sensor and a video processing module wirelessly connected with the infrared sensor are further arranged on the inner liner panel; and the video processing module is connected to the first circuit board.

8. The machine body structure of the six-legged universal walking robot according to claim 1, wherein the front end of the rotating head upwards protrudes and is provided with a frontal face mounting seat matched with the frontal face, and the frontal face is embedded into the frontal face mounting seat.

9. A six-legged universal walking robot, comprising the machine body structure according to claim 1, further comprising multiple leg structures which are radially symmetrically distributed around the machine body structure, wherein, the leg structure comprises a thigh, a shank and a foot which are connected in sequence; the thigh is connected with the machine body through a hip joint and is connected with the shank through a knee joint; the shank is connected with the foot through an ankle joint; a second servo motor and a third servo motor are arranged in the shank at intervals; the second servo motor and the third servo motor are electrically connected with the main control circuit board respectively and are connected with the knee joint and the ankle joint respectively to drive the shank and the foot to rotate 180° respectively around the knee joint and the ankle joint.

10. The six-legged universal walking robot according to claim 9, wherein the ground touch end of the foot is provided with a rubber contact with an outer curved shape; the inner side of the rubber contact is provided with a connecting column; a limit switch is arranged inside the foot and is connected to the main control circuit board; and when the foot touches the ground, the rubber contact is pressed, and the connecting column is pushed to be in contact with the limit switch to actuate the limit switch to be turned on.

11. The six-legged universal walking robot according to claim 10, wherein a static contact block and a movable contact block are arranged on the bottom surface of the limit switch at intervals, and a columnar connecting contact is arranged on the bottom surface of the movable contact block.

12. The six-legged universal walking robot according to claim 11, wherein the connecting column comprises a column head fitted to the inner surface of the rubber contact and an outwards extending column rod; and when the connecting column moves under the pushing of the rubber contact, the column rod touches the connecting contact to actuate the limit switch to be turned on.

13. The six-legged universal walking robot according to claim 9, wherein the hip joint, the thigh and the knee joint are integrally formed, and a length of the thigh in a horizontal direction is smaller than a length of the hip joint and smaller than a length of the knee joint.

14. The six-legged universal walking robot according to claim 13, wherein the hip joint is provided with a first U-shaped groove for holding the machine body; the knee joint being provided with a second U-shaped groove for holding one end of the shank; a first through hole penetrating through the shank is formed in the inner surface of the knee joint; and a first revolving shaft passes through the first through hole to hinge the knee joint to the shank.

15. The six-legged universal walking robot according to claim 14, wherein the ankle joint is provided with a third U-shaped groove for holding the other end of the shank; a second through hole penetrating through the shank is formed in the inner surface of the ankle joint; and a second revolving shaft passes through the second through hole to hinge the ankle joint to the foot.

16. The six-legged universal walking robot according to claim 9, wherein the ankle joint is integrally formed with the foot, and the foot is inclined at an inclination angle of 45° towards one side of the ground along a horizontal plane where the ankle joint is placed.

* * * * *